United States Patent [19]

Yoshida et al.

[11] Patent Number: 4,482,920
[45] Date of Patent: Nov. 13, 1984

[54] PROTECTIVE APPARATUS FOR PICK-UP TUBE

[75] Inventors: Shinichi Yoshida, Hino; Kazutaka Kobayashi, Kokubunji, both of Japan

[73] Assignees: Nippon Interphone Co. Ltd.; Tokyo Electronic Industry Co., Ltd., both of Tokyo, Japan

[21] Appl. No.: 572,951

[22] Filed: Jan. 20, 1984

Related U.S. Application Data

[63] Continuation of Ser. No. 250,234, Apr. 2, 1981, abandoned.

[30] Foreign Application Priority Data

Apr. 14, 1980 [JP]  Japan ................................. 55-50514

[51] Int. Cl.³ ........................ H04N 5/26; H04N 5/197
[52] U.S. Cl. .................................... 358/228; 354/441
[58] Field of Search ............... 358/228, 243, 247, 255, 358/87, 113; 315/10; 354/26, 29

[56] References Cited

U.S. PATENT DOCUMENTS

| | | | |
|---|---|---|---|
| 2,901,539 | 8/1959 | Morgan | 358/228 |
| 3,558,819 | 1/1971 | Larue | 358/228 |
| 3,586,773 | 6/1971 | Niemyer | 358/228 |
| 3,842,201 | 10/1974 | Ghaem-Maghami | 358/243 |
| 4,040,087 | 8/1977 | Hall | 358/113 |
| 4,202,014 | 5/1980 | Gilligan | 358/228 |
| 4,300,167 | 11/1981 | Miller | 358/228 |

Primary Examiner—Tommy P. Chin
Attorney, Agent, or Firm—Murray Schaffer

[57] ABSTRACT

A protective apparatus for a pick-up tube of a television camera includes a photo-electric conversion element for detecting the intensity or amount of light incident on the pick-up tube. A shutter or reflector is disposed in the optical or light path from the outside of a housing for the pick-up tube to its target screen and is rotated by a drive device to be capable of preventing an external light from being incident on the target screen of the pick-up tube when the intensity of the external light detected by the photo-electric conversion element exceeds a predetermined value. A control circuit is provided which will operate the drive device to rotate the shutter or reflector to such a state where the external light is prevented from being incident on the target screen of the pick-up tube when the intensity of the external light detected by the photo-electric conversion element exceeds the predetermined value.

8 Claims, 5 Drawing Figures

FIG. 4
FIG. 5
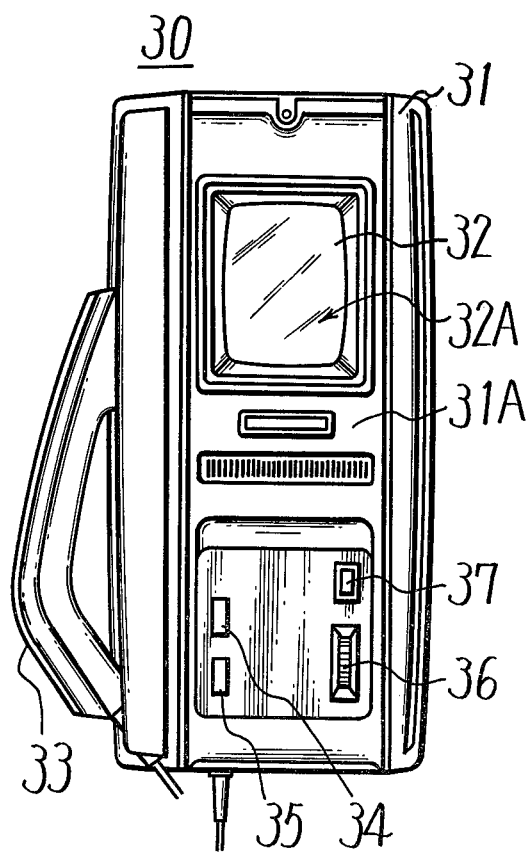
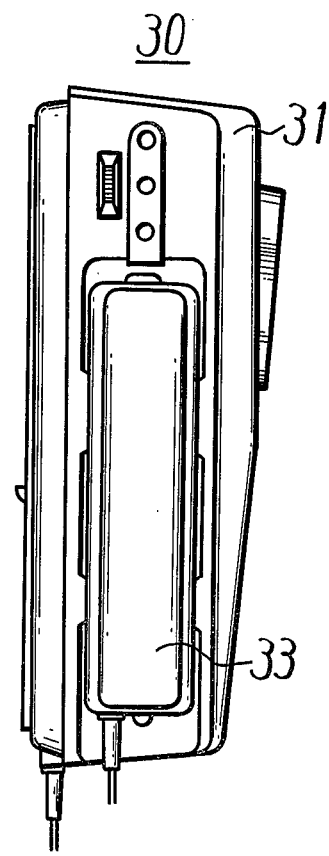

PROTECTIVE APPARATUS FOR PICK-UP TUBE

This is a continuation of U.S. Ser. No. 250,234, filed Apr. 2, 1981, now abandoned.

BACKGROUND OF THE INVENTION

1. Field of the Invention

The present invention relates generally to a protective apparatus for a pick-up tube of a television camera and is directed more particularly to a protective circuit for a pick-up tube of a television camera used in a remote station of an interphone system including a master station.

2. Description of the Prior Art

In general, an interphone system includes a master station and one or more remote stations connected to the master station, and an inter-communication only by a vocal sound or conversation is possible between the master and remote stations. When the remote station of the interphone system is installed near the entrance or the like of a house, the interphone system is generally called as a door-phone system. In such a case, the interphone or door-phone system is used to know the coming of a visitor to a person in the house and also to ascertain who is the visitor.

By the way, almost all interphone system which are widely used at present are only for conversation between the remore and master stations thereof, and a visitor is ascertained through the conversation only. If it is possible to ascertain the visitor by his face and figure in addition to his voice, it is further desirable.

To this end, it may be considered that sound and video signals are both transmitted at the same time from the remote station to the master station when the visitor operates the remote station. In this case, a television receiver is installed in the master station while a pick-up tube of a television camera is installed in the remote station to transmit a so-called video signal from the remote station to the master station. Thus, the image of the visitor who operates the remote station can be reproduced on the television receiver installed in the master station.

In general, the remote station including the pick-up tube of the television camera of the interphone system is located outside the house, for example, on the gate or the like. In this case, when light such as the sun light having the intensity greater than a predetermined value is directly incident on the pick-up tube, there occurs such a fear that the target screen of the pick-up tube is damaged.

OBJECTS AND SUMMARY OF THE INVENTION

Accordingly, an object of the present invention is to provide a protective apparatus for a pick-up tube of a television camera.

Another object of the invention is to provide a protective apparatus for a pick-up tube of a television camera installed in a remote station for use with a master station of an interphone system.

According to an aspect of the present invention, there is provided a protective apparatus for a pick-up tube of a television camera which comprises:

(a) detecting means for detecting an amount or intensity of an external light incident on a pick-up tube of a television camera;

(b) preventing means for preventing the external light from being incident on said pick-up tube when the intensity of the external light exceeds a predetermined value;

(c) driving means including a power source for driving said preventing means; and (d) controlling means for controlling said driving means such that introduction of the external light to said pick-up tube is prevented when the intensity of the external light incident on and detected by said detecting means exceeds the predetermined value.

The other objects, features and advantages of the present invention will become apparent from the following description taken in conjunction with the accompanying drawings through which the like references designate the same elements and parts.

BRIEF DESCRIPTION OF THE DRAWINGS

FIGS. 4 and 5 are respectively a front and a side view of a master station to which the remote station is coupled.

DESCRIPTION OF THE PREFERRED EMBODIMENTS

The present invention will be hereinafter described with reference to the attached drawings.

Figure 1:
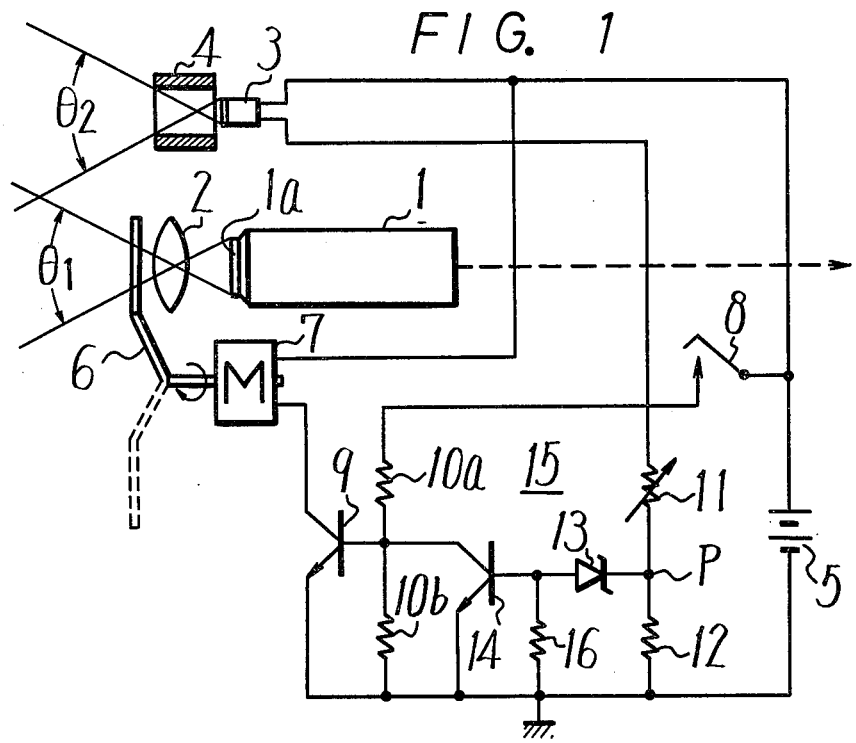
FIG. 1 is a circuit diagram showing an example of the protective apparatus for a pick-up tube of a television camera according to the present invention.

FIG. 1 is a connection diagram showing an example of the present invention which is adapted to protect the pick-up tube of a television camera provided in a remote station of an interphone system including a master station. In FIG. 1, reference numeral 1 designates a pick-up tube such as a vidicon of a television camera whose video output is fed through an amplifier and so on to a master station though not shown. The image of an object (not shown) to be picked up or external light is projected through a master lens 2 on a target screen 1a of the pick-up tube 1. A photo-electric conversion element such as CdS 3 is provided and in front thereof a hood 4 is located so as to make an incident angle $\theta_2$ of the external light on the photo-electric conversion element 3 equal to that $\theta_1$ on the pick-up tube 1. In this case, the direction of the external light incident on the photo-electric conversion element 3 is of course selected equal to that on the pick-up tube 1. A DC power source 5 is also provided.

On the optical path of the external light to the image pick-up tube 1, provided is a shutter 6 which closes the optical or light path to the pick-up tube 1 ordinarily so as to prevent the image of an object to be picked up or external light from being projected on the target screen 1a of the pick-up tube 1. The shutter 6 is driven by a drive device such as a motor 7 which is rotated by a constant angle when being supplied with a current from the power source 5 like a meter. A plunger may be used in place of the motor 7. A switch 8 is provided which may be such a switch ganged with a hook switch of a handset provided in a master station described later or a switch controlled by the handset. Further, as the switch 8, such a switch may be also used which is a push button switch provided in the remote station, a photo-electric switch for automatically detect the approach of an object or visitor to the remote station or a switch controlled by the above switches.

In the example shown in FIG. 1, there are provided the circuit from the power source 5 through the motor 7 and the collector-emitter path of a transistor 9 to the power source 5, and the circuit from the power source 5 through the switch 8, resistors 10a and 10b to the power source 5, respectively. When the switch 8 is made ON, the current is supplied to the base of the transistor 9 and hence the transistor 9 turns ON. As a result, the motor 7 is supplied with the current from the power source 5 throuqh the collector-emitter path of the transistor 9 now turned ON and rotated to bring the shutter 6 to a position shown by the broken line from that shown by the solid line in FIG. 1.

Further, such a circuit is provided which consists of the power source 5- photo-electric conversion elements 3 - a variable resistor 11 - resistor 12 - power source 5. A series connection of a constant voltage element 13 such as a Zener diode or the like and the base -emitter path of a transistor 14 is inserted between a connection P of the resistors 11 and 12 and the ground, and the collector of the transistor 14 is connected to the base of the transistor 9. Thus, a control circuit 15 for the drive device or motor 7 is provided.

According to the control circuit 15, the voltage appearing at the connection point P is varied in response to the amount or intensity of the external light incident on the photo-electric conversion element 3. The voltage at the connection point P, for example, increases as the amount or intensity of the incident external light increases. When the voltage at the connection point P exceeds the Zener voltage of the constant voltage element such as a Zener diode 13, the Zener diode 13 turns ON and hence the transistor 14 turns ON. Thus, the base of the transistor 9 is grounded or the transistor 9 is made OFF. This is the case that the intensity of the external light incident on the element 3 or pick-up tube 1 exceeds a predetermined value. Under such a state, even if the switch 8 is made ON, no current is fed to the motor 7 since the transistor 9 is OFF. As a result, the shutter 6 is still remained at the position shown by the solid line in FIG. 1 to prevent the external light from being incident on the pick-up tube 1. In this case, the variable resistor 11 in the control circuit 15 is adjusted, the voltage appearing at the connection point can be varied and accordingly, such a control can be carried out that the shutter 6 is driven in response to a desired light intensity or amount incident on the photo-electric conversion element 3 or pick-up tube 1.

As described above, according to the present invention, when an external light, which may be intensive to damage the target screen 1a of the pick-up tube 1 or whose intensity exceeds the predetermined value, is incident on the pick-up tube 1 and element 3, the control circuit 15 operates automatically to make the current supply path to the motor 7 OFF and to remain the shutter 6 in the light path to the pick-up tube 1, whereby the target screen 1a thereof is not damaged in any cases.

While, when there is no fear that the target screen 1a of the pick-up tube 1 is not damaged by the light incident thereon or the intensity or amount of the incident light is not so intensive, the voltage at the connection point P is rather low, that is, lower than the Zener voltage of the Zener diode 13. Thus, the Zener diode 13 is not made ON and accordingly the transistor 14 is not made ON also. Thus, if the switch 8 is closed, the transistor 9 is turned ON and the current is supplied to the motor 7. As a result, the motor 7 is driven and the shutter 6 is rotated to the position shown by the broken line in FIG. 1 or removed from the light path to the pick-up tube 1. Thus, the object is picked up by the pick-up tube 1 and the video signal therefrom is transmitted through a cable to the master station described later.

Figure 2:
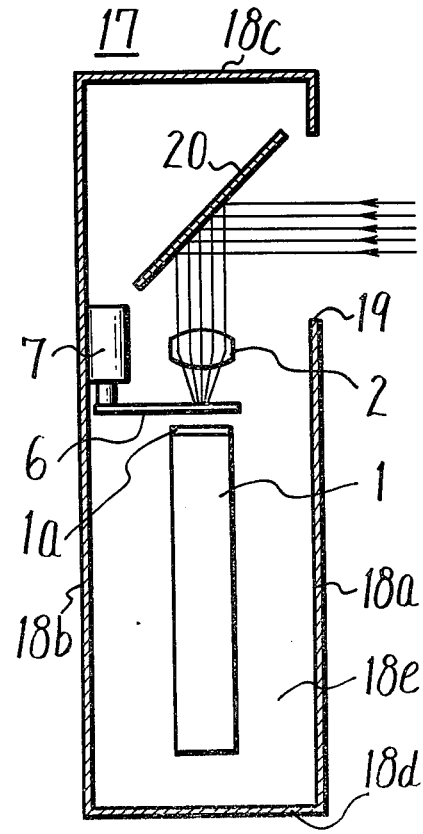
FIG. 2 is a cross-sectional view showing an example of a remote station including a pick-up tube of a television camera to which the example of the invention showing in FIG. 1 is applied.

FIG. 2 is an example of the remote station in which the above example of the invention is employed. In FIG. 2, reference numeral 17 generally designates the housing of the remote station which consists of a front panel 18a, a back plate 18b, an upper plate 18c, a lower plate 18d and a right side plate 18e (a left side plate is not shown) and in which the pick-up tube 1 is accommodated. Through the front panel 18a of the housing 17 near its upper portion, provided is a window 19. The light from an object to be pick-up (not shown) or external light passes through the window 19, enters into the housing 17, reflected on a mirror 20 located in the housing 17 and projected on the target screen 1a of the pick-up tube 1 as an image thereof through the lens 2. In this example, the motor 7 shown in FIG. 1 is attached to the back plate 18b within the housing 17, and the shutter 6 driven by the motor 7 is so located that it is normally positioned between the lens 2 and the target screen 1a of the pick-up tube 1 to shield the projection of the external light from the mirror 20 through the window 19 on the target screen 1a. Though not shown in FIG. 2, the elements such as the photo-electric conversion element 3 etc. forming the control circuit 15 shown in FIG. 1 are accommodated in the housing 17 in connection with the motor 7 so that when, for example a visitor stands near the window 19, the control circuit 15 operates and the shutter 6 is rotated to permit his image incident on the pick-up tube 1.

Figure 3:
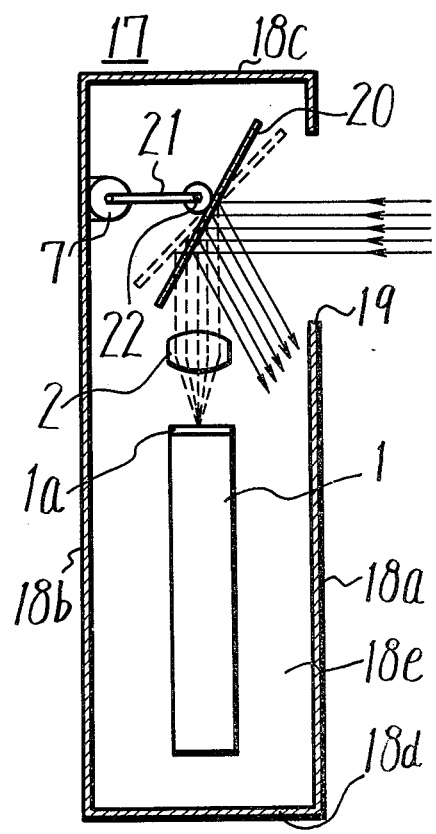
FIG. 3 is a cross-sectional view showing another example of the remote station to which a modified example of the invention is applied.

FIG. 3 shows another example of the remote station in which a modified example of the invention is employed. In this example of the invention the shutter 6, provided in the example shown in FIGS. 1 and 2, is omitted and the mirror 20 is rotated by the motor 7 to alter the light path from the mirror 20 to the target screen 1a of the pick-up tube 1. That is, in the example of FIG. 3, the mirror 20 is rotatably supported about its shaft 22 and the rotation of the motor 7 is transmitted to the mirror 20 through a belt 21. In this case, the control circuit 15 so controls the motor 7 that in the normal state the mirror 20 is held at the position shown by the solid line in FIG. 3 and the external light passed through window 19 from the outside and reflected on the mirror 20 is not projected on the target screen 1a of the pick-up tube 1, but when the switch 8 is turned ON and the incident light is a desired value in intensity at this time, the mirror 20 is rotated to the position shown by the broken line in the figure to project the light reflected thereon on the target screen 1a.

As described above, according to the present invention, since the driving of the shutter 6 or mirror 20 through the motor 7 is controlled properly by the control circuit 15 in response to the amount or intensity of the incident light, it is positively avoided that the target screen 1a of the pick-up tube 1 is damaged by strong light such as the light beam from the sun.

Now, an example of the master station, which is installed in the house and to which the remote station using the example of this invention is connected as set froth above, will be briefly described with reference to FIGS. 4 and 5. In the figures, reference numeral 30 designates the master station generally. The master station 30 includes in its housing 31 a monitor television receiver 32 whose picture screen 32A can be seen from the outside of the housing 31. In the figures, 33 designates a handset for communicating with the visitor. Through a front panel 31A of the housing 31, protruded are a monitor button 34, a free lock button 35, a brightness adjusting knob 36 for the monitor television receiver 32, and an exchange button or switch 37 of day and night. Since the master station 30 has no direct relation to the present invention, it will be described simply. When the monitor button 34 is pressed down, the picture picked up by the television camera in the remote station is reproduced on the picture screen 32A of the monitor television receiver 32. The brightness of the picture screen 32A can be adjusted by operating the knob 36.

In the above example of the invention, the shutter 6 is normally closed and is opened only when the switch 8 is closed and the intensity or amount of the external light incident on the target screen 1a of the pick-up tube 1 is optimum. It may be, however, possible that the shutter is normally opened but closed automatically when the external light becomes intensive or exceeds the given value, which can be easily carried out by somewhat modifying the control circuit 15.

The above is same to the example of FIG. 3 where the mirror 20 is rotated.

It is also apparent that the protective apparatus of the present invention can be applied to an ordinary pick-up tube of a television camera with the same effects.

Although the above description is given on a single preferred embodiment of the present invention, it will be apparent that many modifications and variations could be effected by one skilled in the art without departing from the spirits or scope of the novel concepts of the invention.

We claim as our invention:

1. A protective apparatus for a pick-tube of a television camera comprising:
   (a) detecting means for detecting an amount or intensity of an external light incident on a pick-up tube of a television camera;
   (b) preventing means for preventing the external light from being incident on said pick-up tube when the television camera is not being used;
   (c) driving means including a power source and a first switching means for driving said preventing means;
   (d) controlling means coupled to said detecting means for controlling said first switching means; and
   (e) a second switching means connected between said power source and said switching means, said second switching means being made ON when the television camera is used to make said first switching means ON and drive said preventing means to permit introduction of the external light to said pick-up tube, said controlling means including a means coupled to said detecting means for determining a reference value and for providing a reference voltage when the intensity of the external light exceeds said reference value and a third switching means for operating said first switching means in response to said reference voltage, said controlling means being operative such that when the intensity of the external light exceeds the reference value, even if said second switching means is made ON, said driving means is not driven because said first switching means is not made ON by said controlling means whereby external light is not introduced to said pick-up tube.

2. A protective apparatus as claimed in claim 10, in which said detecting means is a photo-electric conversion element.

3. A protective apparatus as claimed in claim 2, further comprising means so as to make an incident angle of the external light on the detecting means equal to that on said pick-up tube.

4. A protective apparatus as claimed in claim 1, in which said preventing means is a shutter, said shutter being so driven by said driving means that said shutter closes the light path of said external light to said pick-up tube when said television camera is not used.

5. A protective apparatus as claimed in claim 1, in which said preventing means is a reflector rotatably supported around its axis, said reflector being driven by said driving means such that said reflector is rotated to reflect the external light away from said pick-up tube when said television camera is not used.

6. A protective apparatus as claimed in claim 1, wherein said controlling means includes at least a constant voltage element and said third switching means comprises a transistor connected in series thereto, one end of said constant voltage element is coupled to said detecting means and makes said transistor ON when the intensity of the external light incident on said detecting means exceeds the reference value.

7. A protective apparatus as claimed in claim 6, wherein said means for determinating and providing said reference voltage comprises an adjusting element connected between said detecting means and said one end of said constant voltage element so as to adjust said reference voltage in response to the intensity of the external light incident on said detecting means.

8. A protective apparatus as claimed in claim 6, in which said first switching means of said driving means is a switching transistor.

* * * * *